Jan. 20, 1953     L. H. LOCKWOOD     2,625,710
MOLD STRUCTURE

Filed Dec. 13, 1950     2 SHEETS—SHEET 1

INVENTOR
LOUIS H. LOCKWOOD

ATTORNEY

Jan. 20, 1953   L. H. LOCKWOOD   2,625,710
MOLD STRUCTURE
Filed Dec. 13, 1950   2 SHEETS—SHEET 2
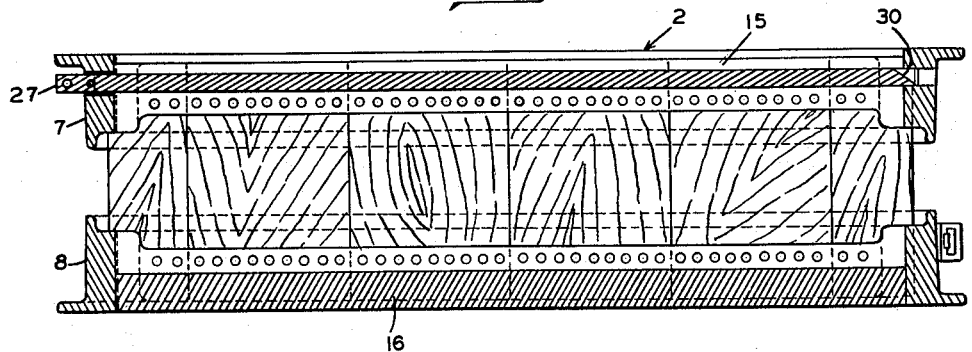
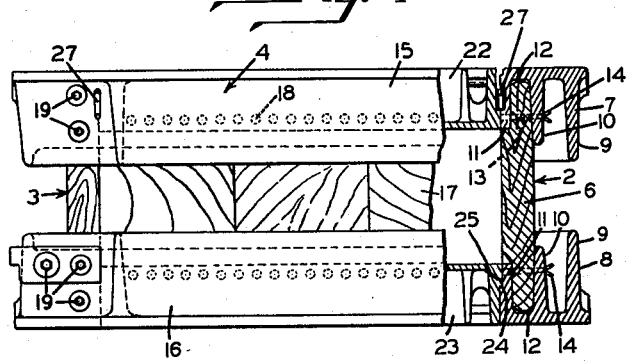
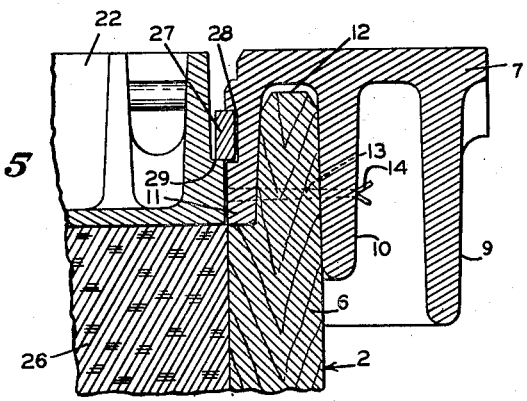
INVENTOR
LOUIS H. LOCKWOOD
ATTORNEY Patented Jan. 20, 1953

2,625,710

UNITED STATES PATENT OFFICE 2,625,710

MOLD STRUCTURE

Louis H. Lockwood, Rohrerstown, Pa., assignor to Armstrong Cork Company, Lancaster, Pa., a corporation of Pennsylvania Application December 13, 1950, Serial No. 200,560

8 Claims. (Cl. 18—34)

The present invention relates to a mold structure and is concerned particularly with a mold for use in the dielectric heating of material such as cork composition which is produced by heating a mass of cork granules coated with a binder such as a mixture of glue, glycerine and formaldehyde in a mold under compression.

As disclosed in Scott Patent 2,526,698, a mold for use in the formation of cork compositions utilizing dielectric heating to convert the binder may be successfully formed from hard wood impregnated with a waterproofing material such as ceresin wax. In commercial manufacture of cork compositions, the mass of binder-coated cork granules may be compressed from a volume of about four to eight units to a single unit. It is necessary, therefore, to provide a mold structure which is of considerable structural rigidity and strength to withstand those forces incident to compression of the granules and maintenance of them under compression until setting has been effected.

An object of this invention is to provide a mold structure which will be structurally rigid and strong to withstand all normal use, even where high compression of the mass in the mold is effected.

Scott Patent 2,526,697 discloses a mold structure for dielectric heating including peripheral conductors which are disposed around the outer perimeter of the mold walls and are electrically connected to the electrodes, serving to establish an intensified field of force in the mold walls and the portions of the mass under treatment which are disposed in engagement with the mold walls and normally lose heat to the mold walls.

Another object of this invention is to provide a mold structure in which the peripheral conductors of the Scott patent are incorporated directly into the mold frame structure.

A further object of the invention is to provide a mold structure having mold walls of dielectric material, peripheral conductors, and means for positively and effectively connecting the peripheral conductors to their respective electrodes in such manner that rapid charging and discharging of the mold may be effected.

In the commercial manufacture of cork compositions a relatively large number of molds are required; and because substantially all of the operations involve mechanical movement of the molds and the heavy electrodes associated with them where dielectric heating is employed and also because of the requirement that dielectric materials such as wood be used in the mold walls, there is the problem of mold repair and parts replacement An additional object of the invention is to provide a mold structure in which each of the mold walls is unitarily formed and in which an interlocking joint arrangement is provided so that in the event of damage to one or more of the mold walls units, a spare wall unit may be quickly and conveniently inserted to replace the damaged unit.

Other objects of the invention are to provide a mold structure in which the compressed mass may be "locked" against re-expansion, with the locking means providing an excellent electrical connection between each mold electrode and the peripheral conductor associated with it; to provide a mold structure in which the upper electrode through which pressure is exerted upon the mass during molding may be moved freely within the confines of the mold, being held against downward travel by the mass under treatment and being held against upward travel by locking keys; and those objects which will become obvious from a consideration of the following description of one embodiment of the invention which is illustrated in the attached drawings, in which:

Figure 3 is a sectional view taken along the line III—III of Figure 1;

Figure 4 is an end elevation of the mold of Figure 1, partially broken away; and Figure 5 is a partial sectional view to an enlarged scale showing one of the mold-locking key arrangements.

Figure 1:
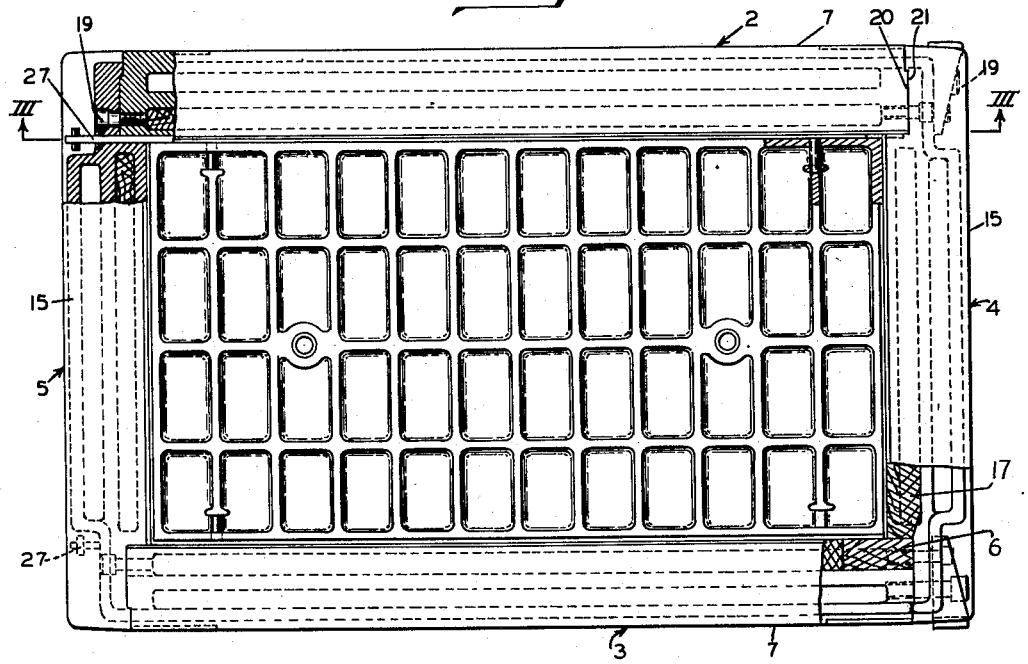
Figure 1 is a top plan view, partially broken away, illustrating a mold structure typical of this invention.
Figure 2:
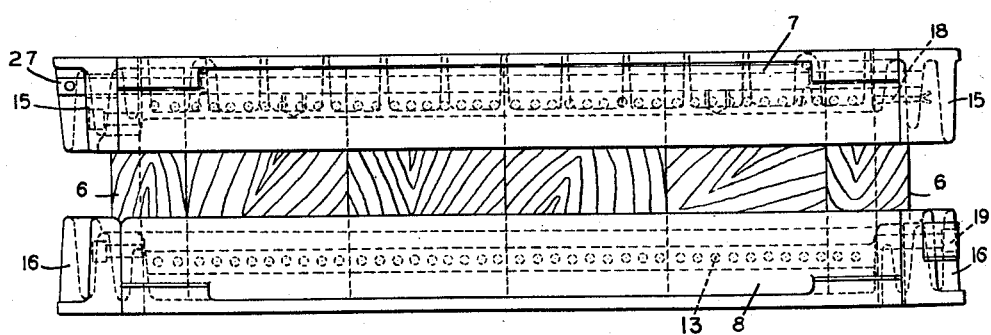
Figure 2 is a side elevation of the mold of Figure 1.

Referring to Figure 1 there is shown a mold which includes side wall members 2 and 3 and end wall members 4 and 5. Each of the side wall members 2 and 3 is made of a plurality of pieces of dielectric material such as pieces 6 of hard wood disposed as panels as shown in Figure 2. These pieces are preferably of the character disclosed in Scott Patent 2,526,698. As shown in Figure 4, each longitudinal or side wall member 2—3 includes an upper metal frame member 7 and a lower metal frame member 8. The frame members 7 and 8 are provided with depending flanges 9, 10, and 11, pockets 12 being defined by the flanges 10 and 11, into which are disposed the ends of the wooden mold wall panels 6 as shown in Figure 5. The wooden panels 6 are machined to properly fit within the upper and lower pockets 12, and securing pins 13 which pass through the flanges 10 and 11 and the wood panels 6 hold the frame members 7 and 8 and the wood panels 6 as a rigid assembly. The pins 13 are preferably tapered and split at their ends, as shown in Figures 4 and 5, and are bent over as indicated at 14 so as to firmly lock the parts together in an assembly which may be readily dismantled in the event replacement of one or more of the wood panels should be necessary.

It will be observed by reference to Figures 4 and 5 that the wood panels 6 are rabbeted to receive the flanges 11, and the structure provides an interior surface between the upper and lower electrodes which consists entirely of a dielectric material, namely, wood; and there are no obstructions which will impede the free upward movement of the formed mass from within the mold when product formation has been completed and discharge of the mold contents is to be effected. Also, there is no metal or other conducting material in the mold walls which would interfere with dielectric heating of the mass in the mold.

The end wall members 4 and 5 are constructed similarly to the side wall members, as indicated in Figures 1 and 2, and comprise upper frame members 15 and lower frame members 16 corresponding to the upper and lower frame members 7 and 8 of the side walls. The walls are formed of pieces of wood 17 disposed as panels as shown in Figure 4. Securing pins 18, as indicated in Figures 2 and 4, are provided and correspond to the pins 13 which join the frame members 7 and 8 and the wood side wall panels 6.

The side wall frame members 7 and 8 and the end wall frame members 15 and 16 are connected in assembled position as an open-ended rectangular box by hollow head machine screws or similar fastening devices 19 as shown in Figures 1 and 4. It will be observed by reference to Figure 1 that the side wall frame members 7 are provided with projecting tongues 20 which are received within corresponding recesses or grooves 21 formed in the end wall frame members 15. The lower side wall frame members 8 are provided with similar tongues and are received within similar recesses in the end wall frame members 16. With this type construction, the wood wall panels 6 and 17 may be prefitted into their respective upper and lower frame members and securely fastened thereto. Then the preassembled unit may be joined into a mold structure by bolting together two side walls and two end wall members. Should any mold member be damaged or fail during service, it is then necessary merely to remove the damaged or defective member and replace it with a new member. The members are machined to fit interchangeably one with another. This reduces the amount of capital required to service and maintain a large number of molds.

The mold as assembled consists of an upper frame made up of two frame members 7 and two frame members 15 mechanically and electrically connected together, a lower frame made up of corresponding frame members 8 and 16 similarly mechanically and electrically connected together, and wood panels 6 and 17 received within pockets in the frame members and secured thereto, forming mold walls of dielectric material free of conducting metal members in the dielectric heating zone.

By having a tongue and groove arrangement, the mold members are mechanically locked together, and the machine screws serve primarily to hold the parts in their mechanically interlocked condition.

As shown in the drawings and particularly in Figure 4, there are provided an upper plate electrode 22 and a lower plate electrode 23 which are received within the open top and bottom of the mold. The lower frame members 8 and 16 are constructed to provide a projecting limiting flange 24 which interengages with a tongue 25 projecting from the periphery of the lower electrode 23. The parts are machined in such fashion that the lower electrode 23 may be freely elevated to extract a completed block of cork composition and when returned to its lowered position, shown in Figure 4, a good electrical connection will be made between the electrode 23 and the lower frame members 8 and 16. The mass of material in the mold under compression continuously urges the lower electrode 23 into seating engagement with the lower frame members 8 and 16.

The upper electrode 22 is movable from a position above the top of the mold, with the mass to be formed disposed in the mold and extending thereabove in a mold-charging boot, to a closed position as shown in Figures 4 and 5, with the mass confined within the mold between the electrodes 22 and 23. In Figure 5 the mass has been diagrammatically indicated at 26 as consisting of a body of granules of cork thinly coated with a binder such as a mixture of glue, glycerine, and formaldehyde. The upper electrode 22 may be moved downwardly by a hydraulic ram, compressing the mass of cork composition within the mold. The amount of compression will vary, depending upon the type of product to be molded. The electrodes 22 and 23 should be spaced a predetermined distance apart during the dielectric heating. This is effected by providing a pair of locking keys 27 as indicated in Figure 1. The upper side frame members 7 are provided with keyways or slots 28 (Figure 5) which are of less depth than the thickness or width of the keys 27 so that when the keys are disposed in the keyways 28 they project laterally therebeyond. The upper electrode 22 is provided on each longitudinal edge with a projecting shoulder 29. Preferably, the material of the upper electrode above the shoulders 29 is removed so that when the electrode 22 is forced to a lowered position within the mold, at least slightly below the position shown in Figure 5, the keys 27 may be inserted without mechanical engagement with the upper electrode. Upon release of the force which lowers the electrode to such position, the force of the mass of cork composition 26 in re-expansion brings the upper electrode 22 to a position where its shoulders 29 firmly contact the keys 27 as shown in Figure 5. This permits ready insertion of the locking keys and also provides a firm mechanical locking of the upper electrode in a predetermined position; at the same time, there is effected an excellent electrical connection between the upper electrode 22 and the upper frame members 7 and 15.

When it is desired to remove the upper electrode to extract the completed block of cork composition, pressure may be applied to the upper electrode 22, slightly compressing the cork composition mass 26, and thus releasing the keys 27 from engagement with the projecting shoulders 29 of the upper electrode 22. The keys 27 are then extracted easily and the upper electrode is removed from within the mold. The lower electrode is elevated to dispose the mass of cork composition above the mold, and the same is discharged from the lower electrode.

The keys 27 are provided with a chisel-shaped forward end 30, as indicated in Figure 3, and thus serve to remove any cork granules which may be disposed in the keyways 28 or on the shoulders 29. These must be removed to provide a good metal-to-metal contact between the keys and the electrode and frame members for an excellent electrical connection between the electrode and the upper frame.

It will be observed by reference to Figure 4 that the distance between the flanges 9 and the flanges 10 which surround the outer periphery of the mold walls is less than the distance between the inner surfaces of electrodes 22 and 23. The flanges 10 thus serve as peripheral conductors in the manner described in Scott patent 2,526,697 and create a more intensive field in the mass and the mold walls than in the remainder of the body, being connected electrically to the electrodes by the keys 27 and by mechanical interengagement of the tongues 25 of the lower electrode 23 with the flanges 24 of the lower frame members 8 and 16. The provision of multiple peripheral conductors such as those indicated at 9 and 10 in Figure 4 is the invention of George E. Gard which is fully disclosed and claimed in a copending application, Serial No. 233,469, filed June 22, 1951, and entitled "Mold Structure for Dielectric Heating." With this structure and advantages of the Scott and Gard inventions may be obtained in a mold of rugged construction without employing conductors separate from the structural frame members which support the panels of dielectric material from which the mold walls proper are constructed.

The mold frames and the electrodes are preferably made of high tensile strength steel castings. The keys are preferably made of heat-treated steel.

I claim:

1. In a demountable mold for the reception of material to be dielectrically heated, the combination of a pair of end wall panels and a pair of side wall panels of dielectric material, upper and lower metal frame members for each wall panel, each of said frame members having an inner and an outer flange which define a pocket which receives one end of a panel, forming a wall unit made up of a wall panel of dielectric material and upper and lower frame members, means passing through said flanges and said wall panel in said pocket for fastening each frame member to its associated panel, metal fasteners joining said wall units at said frame members into a mold body formed of panels of dielectric material having spaced, electrically separate upper and lower metal frames disposed around the periphery of the mold adjacent to the top and bottom thereof, a lower plate electrode received within said mold and movable therethrough from a position in engagement with the inner flange of said lower metal frame member for providing an electrical connection between said lower electrode and said lower frame member, an upper plate electrode received within said mold and movable therethrough from the top, and keys extending along the length of two of said upper frame members and engaging both said upper electrode and said inner flanges of said upper frame members and providing an electrical connection between said upper electrode and said upper frame members throughout substantially the full length of said keys.

2. In a mold for the reception of material to be dielectrically heated, the combination of four wall units, each of which comprises an upper metal frame member, a lower metal frame member, a panel of dielectric material, the upper and lower edges of which are received within pockets provided in said upper and lower metal frame members, and metal fastenings received in said metal frame members removably joining said wall units together at said upper and lower metal frame members and bringing the edges of two of said panels of dielectric material into abutting relationship with the other two panels to form a mold the walls of which are constituted of dielectric material and have separate electrically connected metal conductors extending around the upper and lower peripheries thereof at the inner and outer surfaces of said panels of dielectric material.

3. In a mold for the reception of material to be dielectrically heated, the combination of claim 2 in which two of the wall units include tongues on the upper and lower frame members which are received within grooves in the upper and lower frame members of the two other wall units to mechanically interlock said wall units.

4. In a mold for the reception of material to be dielectrically heated, the combination of four wall units each of which comprises an upper metal frame member, a lower metal frame member, a panel of dielectric material, the upper and lower edges of which are received within pockets provided in said upper and lower metal frame members, metal fastenings received in said metal frame members removably joining said wall units together at said upper and lower metal frame members and bringing the edges of two of said panels of dielectric material into abutting relationship with the other two panels to form a mold the walls of which are constituted of dielectric material and have separate electrically connected metal conductors extending around the upper and lower peripheries thereof at the inner and outer surfaces of said panels of dielectric material, an electrode received within said mold and electrically connected to said lower metal conductor, an upper electrode removably received within said mold, and keys connecting said upper electrode to said upper metal conductor.

5. In a mold for the reception of material to be dielectrically heated, the combination of a mold wall of dielectric material, a metal frame secured to the upper end of the mold wall, said frame having a pair of flanges extending along both the inner and outer surfaces of said mold wall and constituting a peripheral conductor disposed around the inner and outer perimeter of the mold, an electrode removably received within the mold, a shoulder projecting outwardly from each of two edges of said electrode, keyways provided in said inner flange of said metal frame complementary to said shoulders, and removable keys received within said keyways in said metal frame and projecting laterally therefrom and engaging said shoulders on said electrode to limit movement of said electrode with respect to said mold and to electrically connect said electrode and frame together.

6. In a mold for the reception of material to be dielectrically heated, the combination of a mold wall of dielectric material, a metal frame secured to the upper edge of the mold wall and extending outwardly and downwardly therefrom as a peripheral conductor disposed around the outer perimeter of the mold, an electrode movable with respect to the mold wall to a position therewithin in engagement with a mass to be treated disposed within the mold, a shoulder projecting outwardly from each of two edges of the electrode, said frame being provided with two keyways complementary to said shoulders, and keys received in said keyways and projecting laterally therefrom for engagement with said shoulders to limit movement of said electrode with respect to said mold and electrically connect said electrode and frame.

7. In a mold for the reception of material to be dielectrically heated, the combination of a mold wall of dielectric material, metal frame members joined to the wall at the upper and lower edges thereof and extending around the perimeter of the mold at the top and bottom and projecting outwardly therefrom to provide peripheral conductors, a lower electrode movable within said mold from a lowered molding position to an elevated extraction position, means on said electrode and lower frame for limiting downward movement of said electrode and for electrically connecting said electrode and lower frame, an upper electrode received within said mold, an exposed shoulder projecting outwardly from each of two edges of the electrode, said upper frame being provided with two keyways complementary to said shoulders, and keys received in said keyways and projecting laterally therefrom for engagement with said shoulders to limit upward movement of said electrode with respect to said mold and electrically connect said electrode and upper frame, said exposed shoulder permitting downward movement of said electrode to disengage the keys therefrom and facilitate their removal.

8. In a mold for the reception of material to be dielectrically heated, the combination of four mold walls of dielectric material, metal frame members secured to the upper and lower ends of the mold walls, said frame members each having inner and outer flanges extending along the inner and outer surfaces of said mold walls, said outer flanges constituting peripheral conductors disposed around the outer perimeter of the mold at the top and bottom thereof, a lower plate electrode received within the mold in engagement with said lower metal frame member, an upper plate electrode received within said mold and movable therethrough from the top, and keys extending along the length of two sides of said upper plate electrode and engaging both said upper plate electrode and said inner flange of said upper metal frame and providing an electrical connection between said upper plate electrode and said upper metal frame throughout substantially the full length of said keys.

LOUIS H. LOCKWOOD.

REFERENCES CITED

The following references are of record in the file of this patent:

UNITED STATES PATENTS

| Number | Name | Date |
|---|---|---|
| 414,918 | Paul | Nov. 12, 1889 |
| 1,958,422 | Dinzl | May 15, 1934 |
| 1,965,732 | Bisterfeld | July 10, 1934 |
| 2,521,128 | Ramsay | Sept. 5, 1950 |
| 2,526,697 | Scott, Jr. | Oct. 24, 1950 |